United States Patent
Amman et al.

(10) Patent No.: US 10,186,260 B2
(45) Date of Patent: Jan. 22, 2019

(54) SYSTEMS AND METHODS FOR VEHICLE AUTOMATIC SPEECH RECOGNITION ERROR DETECTION

(71) Applicant: Ford Global Technologies, LLC, Dearborn, MI (US)

(72) Inventors: Scott Andrew Amman, Milford, MI (US); Joshua Wheeler, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/610,172

(22) Filed: May 31, 2017

(65) Prior Publication Data

US 2018/0350355 A1 Dec. 6, 2018

(51) Int. Cl.

| | |
|---|---|
| *B60H 1/00* | (2006.01) |
| *G10L 15/20* | (2006.01) |
| *G10L 15/22* | (2006.01) |
| *G10L 25/78* | (2013.01) |
| *G10L 25/84* | (2013.01) |
| *B60R 16/037* | (2006.01) |

(52) U.S. Cl.
CPC .......... *G10L 15/20* (2013.01); *B60H 1/00757* (2013.01); *B60R 16/0373* (2013.01); *G10L 15/22* (2013.01); *G10L 25/84* (2013.01); *G10L 2025/783* (2013.01)

(58) Field of Classification Search
CPC ............................ G10L 15/20; G10L 21/0272
See application file for complete search history.

(56) References Cited

U.S. PATENT DOCUMENTS

| | | | |
|---|---|---|---|
| 6,278,377 B1* | 8/2001 | DeLine | B60R 1/12 340/425.5 |
| 8,285,545 B2 | 11/2012 | Lee et al. | |
| 8,447,044 B2 | 5/2013 | Nongpiur et al. | |
| 8,682,005 B2 | 3/2014 | Watson et al. | |
| 9,330,684 B1 | 5/2016 | Kirsch | |
| 9,418,674 B2 | 8/2016 | Tzirkel-Hancock et al. | |
| 2004/0246607 A1* | 12/2004 | Watson | B60R 1/12 359/872 |
| 2004/0260547 A1* | 12/2004 | Cohen | G10L 15/20 704/233 |
| 2007/0005206 A1* | 1/2007 | Zhang | G06F 3/16 701/36 |
| 2008/0226098 A1* | 9/2008 | Haulick | G10L 21/0208 381/94.9 |

(Continued)

FOREIGN PATENT DOCUMENTS

DE 102011003730 A1 8/2012

*Primary Examiner* — Brian L Albertalli
(74) *Attorney, Agent, or Firm* — James P. Muraff; Neal, Gerber & Eisenberg LLP

(57) ABSTRACT

Method and apparatus are disclosed for detecting ASR errors. An example vehicle includes a microphone for automatic speech recognition (ASR), a climate control system, and a processor. The processor is configured to receive data captured by the microphone, determine, based on the received data, that a level of buffeting detected by the microphone exceeds a threshold level corresponding to buffeting caused by the climate control system, and responsively provide an alert indicating that a climate control vent is aimed at the microphone.

15 Claims, 3 Drawing Sheets

(56) References Cited

U.S. PATENT DOCUMENTS

| | | | |
|---|---|---|---|
| 2009/0115635 A1* | 5/2009 | Berger | G01H 3/08 |
| | | | 340/943 |
| 2009/0216526 A1* | 8/2009 | Schmidt | G10L 21/0208 |
| | | | 704/226 |
| 2012/0140946 A1* | 6/2012 | Yen | H04R 1/1083 |
| | | | 381/92 |
| 2012/0191447 A1* | 7/2012 | Joshi | G10L 21/0208 |
| | | | 704/226 |
| 2013/0211828 A1* | 8/2013 | Gratke | G10L 21/0216 |
| | | | 704/226 |
| 2015/0239320 A1 | 8/2015 | Eisenhour et al. | |
| 2016/0019890 A1* | 1/2016 | Amman | G10L 25/60 |
| | | | 704/233 |
| 2016/0019904 A1* | 1/2016 | Charette | G10L 25/60 |
| | | | 704/227 |
| 2016/0267908 A1* | 9/2016 | Borjeson | G10L 15/22 |

* cited by examiner

SYSTEMS AND METHODS FOR VEHICLE AUTOMATIC SPEECH RECOGNITION ERROR DETECTION

TECHNICAL FIELD

The present disclosure generally relates to automatic speech recognition (ASR) in a vehicle and, more specifically, systems and method for vehicle ASR error detection.

BACKGROUND

Many modern vehicles may include automatic speech recognition technology for use with hands free calling. The ASR technology often includes a microphone positioned in an interior of the vehicle to pick up the driver's voice. Data from the microphone is processed in order to pick out the word and commands spoken by the driver. Appropriate action is then taken.

The position of the microphone, while helpful for picking up the driver's voice, can include noise from various sources including the vehicle speakers, HVAC system, or open windows. These noise sources can cause the ASR to be unsuccessful, resulting in a poor user experience.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for detecting the cause of errors in ASR for a vehicle. An example disclosed vehicle includes a microphone for automatic speech recognition (ASR), a climate control system, and a processor. The processor is configured to receive data captured by the microphone, determine, based on the received data, that a level of buffeting detected by the microphone exceeds a threshold level corresponding to buffeting caused by the climate control system, and responsively provide an alert indicating that a climate control vent is aimed at the microphone.

An example disclosed method includes receiving data captured by a vehicle microphone used for automatic speech recognition (ASR). The method also includes determining, based on the data, that a level of buffeting detected by the microphone exceeds a threshold level corresponding to buffeting caused by a climate control system of the vehicle. The method further includes responsively providing an alert indicating that a climate control vent is aimed at the microphone.

A third example may include means for receiving data captured by a vehicle microphone used for automatic speech recognition (ASR). The third example may also include means for determining, based on the data, that a level of buffeting detected by the microphone exceeds a threshold level corresponding to buffeting caused by a climate control system of the vehicle. The third example may further include means for responsively providing an alert indicating that a climate control vent is aimed at the microphone.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
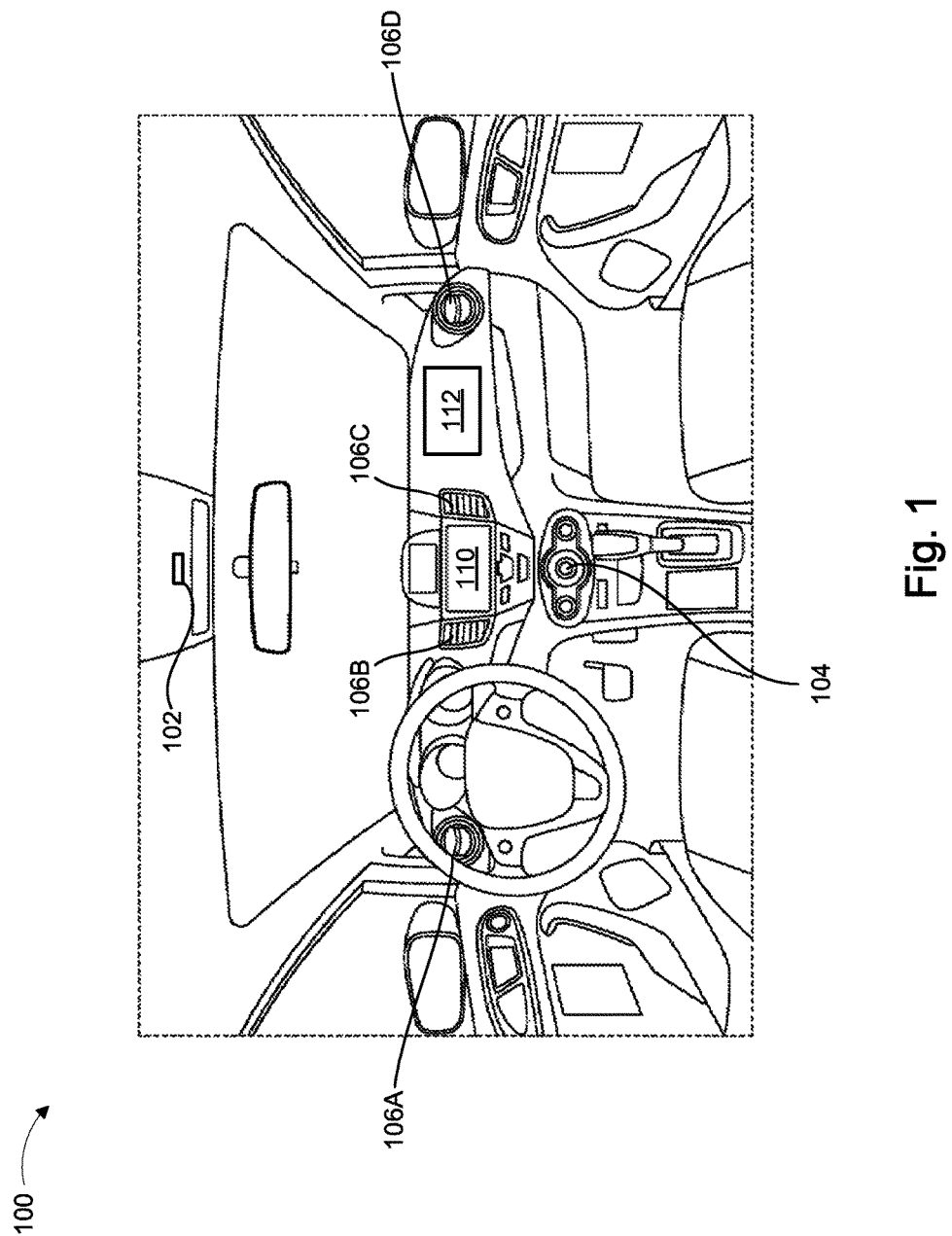
FIG. 1 illustrates an interior perspective view of an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include ASR technology for use by a driver, such that the driver may operate "hands-free." The use of ASR technology may include the driver pushing a button to start, the microphone picking up voice and other noise signals, and the processor processing the received signals to recognize or determine whether any words were spoken that should be acted on. The processing step may often require a threshold level of signal to noise, such that words can be extracted. But in many cases, there are noise sources which may interfere with the ability of the ASR system to recognize words spoken by the driver.

Where the ASR system is unable to operate effectively due to noise, the driver may wish to know the source of the noise, so he or she can reduce the noise and allow the ASR system to operate. But determining the cause of the noise is often difficult or impossible. This can lead the driver to become frustrated with the ASR system and have an overall poor user experience.

Examples herein may enable the ASR system to determine the cause of errors, and allow the driver to correct such errors. An example vehicle may include a microphone for automatic speech recognition, which may be positioned near the head of a driver, in a center portion of the vehicle.

The vehicle may also include a climate control system, having vents positioned in various places throughout the vehicle. The climate control system may have one or more fans or blowers, which can be set to various levels. The vents of the climate control system may also be configured to rotate, twist, or otherwise direct the air coming out.

In some examples, the air coming out of the vents may be directed onto the microphone, causing the microphone to experience buffeting noise which may cause errors in speech recognition. Buffeting may include a vibration or fluctuation of the microphone due to the air being directed at the microphone from a vent or vents. Microphones work by fluctuating or flexing a diaphragm in response to changes in air pressure, and turning the fluctuations into an electronic signal. As such, unintended fluctuations caused by the air from the vents may render the microphone ineffective or unusable for ASR purposes.

The occurrence of buffeting can be determined based on signals picked up by the microphone. The example vehicle may include a processor configured to receive data captured by the microphone, and to determine from the data the level of buffeting being experienced. The level of buffeting may correlate with the speed of air coming out of the vents.

In some examples, the level of buffeting may be compared to a threshold level. ASR technology may be able to operate even when there is buffeting noise experienced by the microphone. And buffeting noise may be cause by multiple sources, including air from the climate control system vents, air from outside the vehicle coming through an open window. As such, the threshold level may be set to a level at which ASR is no longer possible, and such that the threshold corresponds to a level of buffeting caused by the climate control system. Then, when the detected level of buffeting is above the threshold level, the vehicle may indicate to the driver that air from the vents is causing buffeting, causing the ASR to fail. The driver may then be instructed to change the direction of one or more vents, to reduce buffeting.

FIG. 1 illustrates an inside perspective view of an example vehicle 100 according embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a microphone 102, a climate control system 104, a display 110, and a processor 112. Vehicle 100 may include one or more additional electronic components, described in further detail with respect to FIG. 2.

Microphone 102 of vehicle 100 may be a single microphone, or may include a plurality of microphones. Where microphone 102 includes a plurality of microphones, microphone 102 may be an array locating in a single location or distributed throughout vehicle 100. Further, microphone 102 may be located in an overhead portion of vehicle roof (i.e., near a driver's head), or may be located in an overhead console, rear-view mirror, door, frame, front console, or other area of vehicle 100. In some examples, the position of microphone 102 may be in line with air coming out of one or more vents 106A-D of a climate control system 104.

Microphone 102 may operate by flexing or fluctuating in response to changes in air pressure. As such, when air is directed at a diaphragm of microphone 102, buffeting may occur. Buffeting may include non-periodic low frequency high amplitude noise. In some examples, buffeting may cause noise between 0-2000 Hz. This buffeting noise may distort the microphone signal, rendering ASR more difficult or even impossible.

In some examples, the position and number of microphone(s) 102 may depend on the type of vehicle. For instance, smaller vehicle may include a single microphone, while larger vehicles may include a plurality.

Vehicle 100 may also include a climate control system 104. The climate control system may be configured to regulate the temperature of vehicle, and as such may include both heating and cooling elements. In some examples, climate control system 104 may include one or more vents 106A-D, which may be positioned in vehicle 100 at various locations.

Climate control system 104 may include one or more dials, buttons, or other user interface components. Further, climate control system 104 may be configured to operate with a plurality of settings, including multiple blower levels, vent configurations, fan speeds, etc. The blower levels may range from 1 to 7, with 7 being a high setting and 1 being a low setting. Climate control system 104 may also be able to change the speed, temperature, volume, and direction of air coming out of vents 106A-D. As such, a level of buffeting caused by air coming from vents 106A-D can correspond to the speed, temperature, volume, and direction of air coming out of the vents.

Vehicle 100 may also include a processor 112. Processor may be configured to receive data captured by microphone 102. The data may include background noise and speech noise (or data). In some examples, the features described herein may be performed with respect to the background noise.

In some examples, processor 112 may be configured to determine a level of buffeting experienced by the microphone 102. This determination may be performed on data captured over a period of time, such as a second or more beginning when a driver pushes a "push to talk" button. As such, the determination may be performed prior to the driver speaking.

The level of buffeting can be determined based on fluctuation strength and frequency of the signal received from the microphone. The fluctuation strength may be measured in units of vacils. In some examples, the level of buffeting may be measured as a summation over a period of time (e.g., 1 second). Further, determination of the level of buffeting can include an analysis of the data from the microphone with a fast Fourier transform (FFT). Buffeting may generally correspond to high amplitude, low frequency noise. And as such, buffeting may cause problems for human speech.

In some examples, buffeting may be independent from masking noise (e.g., noise from a vehicle radio, additional speaking voices in the vehicle, the engine running, etc.). Thus, buffeting may occur and may cause ASR errors regardless of the level of noise from other sources.

Processor 112 may be configured to determine that the level of buffeting exceeds a threshold corresponding to buffeting caused by the climate control system. The threshold may be set, or may be dynamic and change over time. In some examples, the threshold level of buffeting may be based on vehicle type. For instance, larger and smaller vehicles may have different thresholds, the vehicle type may indicate one or more vent positions, different HVAC systems with different vent output levels and configurations, etc. Further, different vehicle types may have different interior structures, which may affect airflow and thus the level of buffeting.

In some examples, the threshold may correspond to a blower level of the climate control system 104. For instance, a higher blower level may correspond to a higher threshold. Alternatively, a higher blower level may correspond to a lower threshold level. Processor 112 may receive a blower level, and may responsively set the threshold based on the received blower level.

In some examples, the threshold setting process may include receiving initialization data comprising a plurality of speech inputs for ASR. The plurality of speech inputs may be captured under different climate control settings and vent configurations or orientations by the microphone 102. The plurality of speech inputs (and any buffeting that occurs) may then be analyzed to determine whether speech can be recognized. The threshold buffeting level may be responsively determined, and may be tied to the level of buffeting at which a threshold number of speech recognition failures occur (e.g., 90% success rate). In this way, a threshold may correspond to a real world configuration of the vehicle.

Vehicle 100 may also include a display 110. Processor 112 may be configured to provide, via display 110, an alert to the driver indicating that ASR will not work because of buffeting. The display may include text or pictures indicating that the vent position is causing air to be directed onto the microphone. In some examples, the display may alert the driver that the direction of one or more vents is causing the ASR to not function, and may instruct driver to change the vent configuration before ASR will work.

In some examples, processor 112 may, responsive to a determination that the level of buffeting experienced by the microphone exceeds the threshold, reduce the speed of air flowing from one or more of the vents 106A-D. This reduction may be automatic, and may depend on a current blower speed level. The reduction in blower speed may occur only when receiving data via the microphone (i.e., when push to talk button is pressed and shortly thereafter). In this way, the climate control system may still operate at a high level when the driver is not attempting to speak and be understood by the ASR system.

In some examples, the reduction in blower speed may correspond to a level of buffeting detected, such that the blower speed is reduced until the level of buffeting detected is below the threshold. For instance, where the blower is at a high level, it may be reduced by two settings (e.g., from 7 to 5). If the detected buffeting is still above the threshold, the blower level may be further reduced (e.g., from 5 to 4). The reduction may be temporary, and the blower level may return after the microphone captures the data.

In some examples, processor 112 may cause one or more of vents 106A-D to automatically change the direction of air flowing out, so as to deflect air or avoid aiming at microphone 102. In this way, buffeting errors may be mitigated without the driver having to take any further action.

Figure 2:
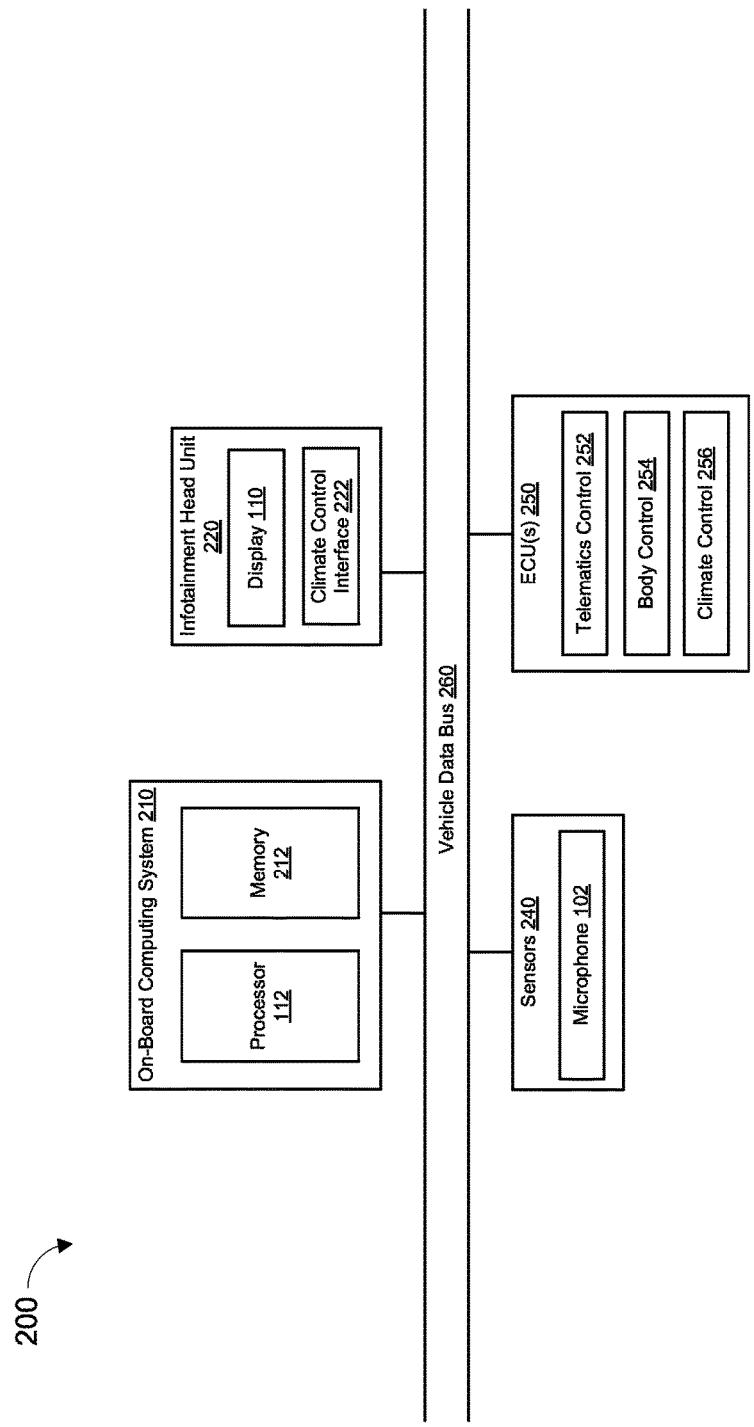
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, sensors 240, electronic control unit(s) 250, and vehicle data bus 260.

The on-board computing system 210 may include a microcontroller unit, controller or processor 112 and memory 212. Processor 112 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 112 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 110, and climate control interface 222. Climate control interface 222 may be an interface for climate control system 104. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display 110 of vehicle 100.

Sensors 240 may be arranged in and around the vehicle 100 in any suitable fashion. In the illustrated example, sensors 240 include microphone 102. Microphone 102 may be electrically coupled to on-board computing system 210, such that on-board computing system 210 may receive/transmit signals with microphone 102. Other sensors may be included as well, such as other noise detection sensors, air flow sensors, and more.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the climate control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The climate control unit 256 may control the speed, temperature, and volume of air coming out of one or more vents. The climate control unit 256 may also detect the blower speed (and other signals) and transmit to the on-board computing system 210 via data bus 260. Other ECUs are possible as well.

Vehicle data bus 260 may include one or more data buses that communicatively couple the on-board computing system 210, infotainment head unit 220, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3:
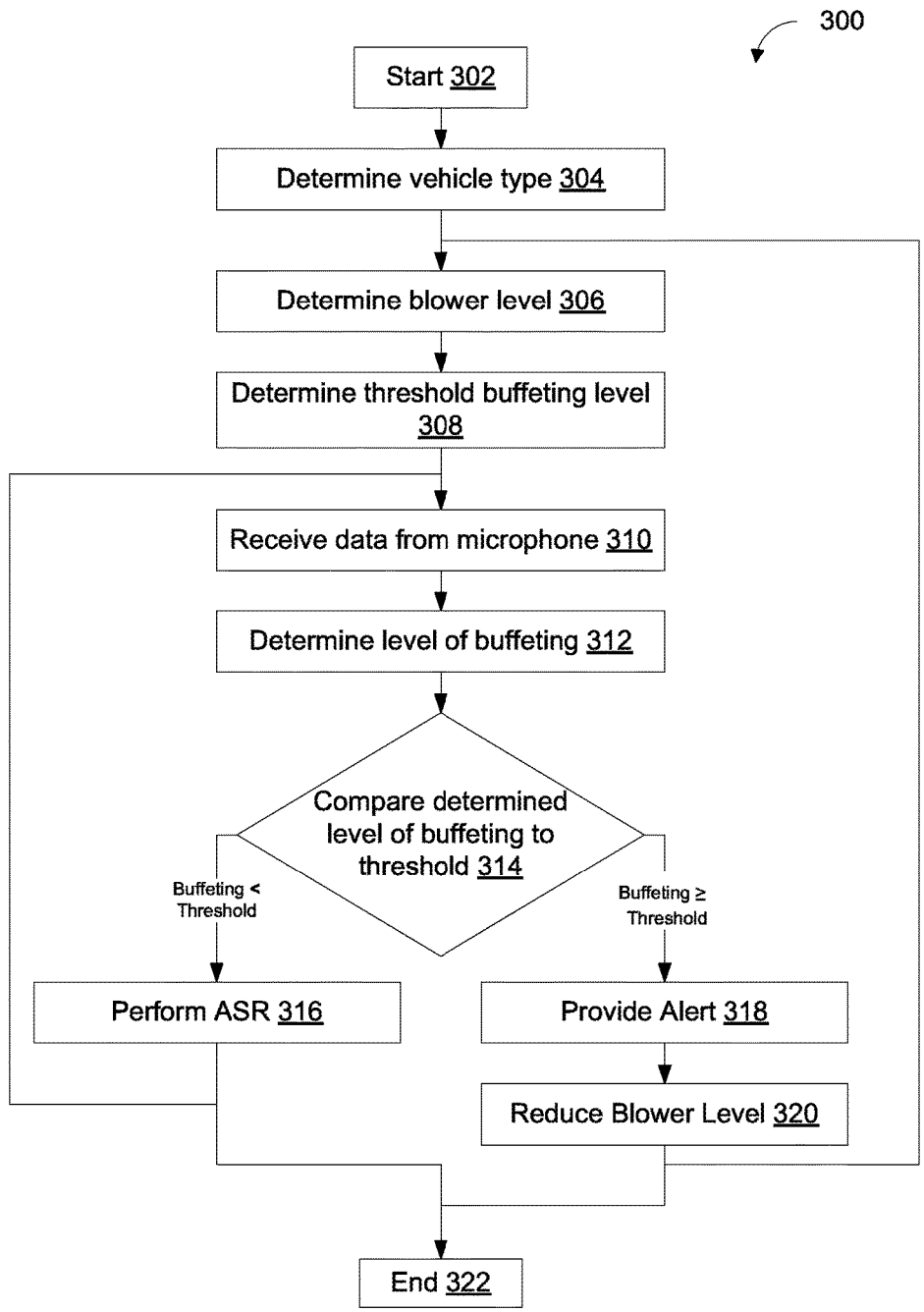
FIG. 3 illustrates a flowchart of an example method according to embodiments of the present disclosure.

FIG. 3 illustrates a flowchart of an example method 300 according to embodiments of the present disclosure. Method 300 may enable an ASR system to determine that one cause of errors is buffeting experienced by the microphone, and to alert a driver of the cause of the error. The flowchart of FIG. 3 is representative of machine readable instructions that are stored in memory (such as memory 212) and may include one or more programs which, when executed by a processor (such as processor 112) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include determining a vehicle type. The vehicle type may correspond to the position of one or more microphones or vents, the characteristics of the climate control system, and may be used to determine a threshold level of buffeting.

At block 306, method 300 may include determining a blower level. The blower level may correspond to the threshold buffeting level, such that the threshold changes based on a change in the blower level.

At block 308, method 300 may include determining a threshold buffeting level. The threshold may be set based on the determined vehicle type and the determined blower level. In some examples, the threshold may also be determined based on initialization data, including speech data that is processed having various vehicle settings to develop the threshold.

Block 310 of method 300 may include receiving data from the microphone. This may include a driver pushing a push-to-talk button, and capturing data in the time shortly after the button press. At block 312, method 300 may then include processing the data to determine a level of buffeting experienced by the microphone. In some examples, the data may include both speech data and background data. The background data may be processed in order to determine the level of buffeting.

The determined level of buffeting may then be compared to the threshold level at block 314. If the detected level of buffeting is below the threshold level, block 316 of method 00 may include performing ASR. However if the buffeting is above the threshold, method 300 may include providing an alert at block 318. The alert may indicate to the driver that buffeting is occurring and is causing an error in the ASR. The alert may also indicate that the driver should change a direction of air flowing from a vent in order to mitigate the buffeting error.

At block 320, method 300 may include reducing a blower level of the climate control system. This may reduce the speed and/or volume of air directed at the microphone, which may mitigate some or all of the buffeting. In some examples, method 300 may then proceed back to block 306, at which point the blower level, threshold, and level of buffeting is again determined. This may allow the method to continue reducing the blower level until the level of buffeting is below the threshold. Method 300 may then end at block 322.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a microphone for automatic speech recognition (ASR);
a climate control system; and
a processor configured to:
receive data captured by the microphone and a climate control blower level from the climate control system;
   adjust a threshold level based on the climate control blower level;
compare a level of buffeting from the data with the threshold level;
   provide an alert in response to the level of buffeting satisfying the threshold level.

2. The vehicle of claim 1, wherein the microphone is positioned inside the vehicle in a path of air flowing out of a vent of the climate control system.

3. The vehicle of claim 1, wherein the climate control system comprises a vent, and wherein the level of buffeting corresponds to a speed of air flowing out of the vent.

4. The vehicle of claim 1, wherein the data captured by the microphone comprises speech noise and background noise, and wherein the level of buffeting is detected based on the background noise.

5. The vehicle of claim 1, wherein the processor is further configured to:
receive initialization data captured by the microphone, the initialization data comprising a plurality of speech inputs for ASR; and
determine the threshold level based on the initialization data, wherein the threshold level corresponds to a level at which a number of speech recognition failures is below a threshold number.

6. The vehicle of claim 1, wherein the threshold level is based on a type of vehicle.

7. The vehicle of claim 1, wherein the processor is further configured to:
reduce a speed of air flowing from a vent of the climate control system in response to the level of buffeting satisfying the threshold level.

8. The vehicle of claim 7, wherein the processor is further configured to reduce the speed of air flowing from the vent of the climate control system until the level of buffeting is below the threshold level.

9. The vehicle of claim 1, wherein the processor is configured to increase the threshold level as the climate control blower level increases.

10. A method comprising:
receiving data captured by a vehicle microphone used for automatic speech recognition (ASR);
receiving a climate control blower level from a climate control system of a vehicle;
adjusting a threshold level based on the climate control blower level;
comparing, via a vehicle processor, a level of buffeting from the data with the threshold level; and
responsive to the level of buffeting satisfying the threshold level, providing an alert.

11. The method of claim 10, wherein the climate control system comprises a vent, and wherein the level of buffeting detected by the microphone corresponds to a speed of air flowing out of the vent.

12. The method of claim 10, wherein the data comprises speech noise and background noise, and wherein the level of buffeting is detected based on the background noise.

13. The method of claim 10, further comprising:
receiving initialization data captured by the vehicle microphone, the initialization data comprising a plurality of speech inputs for ASR; and
determining the threshold level based on the initialization data, wherein the threshold level corresponds to a level at which a number of speech recognition failures is below a threshold number.

14. The method of claim 10, further comprising:
responsive to the level of buffeting satisfying the threshold level, reducing a speed of air flowing from a vent of the climate control system.

15. The method of claim 14, further comprising:
reducing the speed of air flowing from the vent of the climate control system until the level of buffeting is below the threshold level.

* * * * *